(12) United States Patent
Iida (10) Patent No.: US 7,909,624 B2
(45) Date of Patent: Mar. 22, 2011

(54) CARABINER UNIVERSAL SERIAL BUS HUB

(75) Inventor: Yoko Iida, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 941 days.

(21) Appl. No.: 11/691,173

(22) Filed: Mar. 26, 2007

(65) Prior Publication Data

US 2008/0239681 A1   Oct. 2, 2008

(51) Int. Cl.
*H01R 13/44* (2006.01)
(52) U.S. Cl. .......................... 439/131; 439/135
(58) Field of Classification Search ............. 439/57, 439/135, 131, 134
See application file for complete search history.

(56) References Cited

U.S. PATENT DOCUMENTS

| | | | |
|---|---|---|---|
| 5,005,266 A | 4/1991 | Fister et al. | |
| 6,786,743 B2 * | 9/2004 | Huang | 439/131 |
| 6,979,143 B2 | 12/2005 | Goldberg | |
| 7,106,858 B2 | 9/2006 | Goldberg | |
| D530,717 S | 10/2006 | Mori et al. | |
| 7,121,852 B2 * | 10/2006 | Ng et al. | 439/131 |
| 2003/0224655 A1 | 12/2003 | Chen et al. | |
| 2004/0109722 A1 * | 6/2004 | Huang | 403/57 |
| 2004/0205255 A1 | 10/2004 | Joachim | |
| 2005/0277316 A1 * | 12/2005 | Cohen | 439/135 |
| 2009/0102414 A1 * | 4/2009 | Fowler | 320/101 |

* cited by examiner

*Primary Examiner* — Truc T Nguyen
(74) *Attorney, Agent, or Firm* — O'Melveny & Myers LLP (57) ABSTRACT

A connector hub apparatus is provided that has a carabiner clip connected to one or more portions of the apparatus. The apparatus can utilize a locking or non-locking type carabiner clip to secure the hub to a bag, belt loop, etc. for quick and easy transport of the apparatus. The hub apparatus can also be clipped around a group of wires or cables to securely fasten the hub in a position off the user's desktop, thus freeing up desk space. In one embodiment, the hub apparatus has an integrated upstream cable and plug that folds out from the apparatus, thereby eliminating the need to carry an upstream cable with the hub apparatus when traveling.

16 Claims, 5 Drawing Sheets

CARABINER UNIVERSAL SERIAL BUS HUB

BACKGROUND OF THE INVENTION

1. Field of the Invention

The present invention relates generally to a serial hub apparatus, and more particularly, to a serial hub with a carabiner clip attached to one or more portions of the hub.

2. Description of Related Art

In many applications, it is advantageous to interconnect a single serial computer port to multiple peripheral devices. A hub provides a convenient central data connection point for attaching multiple peripheral devices to a computer. The hub relays data from the computer to all enabled devices connected to the data hub, and relays data from the enabled devices to the computer. This data relay can be performed without any data storage or significant delay. The hub can be connected to the computer via a single upstream connector. The hub can include a plurality of downstream ports for connecting the peripheral devices to the hub. Hubs utilize standardized connectors at the upstream and downstream ports to provide universal connectivity between peripheral devices and the computer, thus simplifying these connections. Hub assemblies utilizing serial data transfer protocols and the corresponding electrical or electro-optical connectors operate in a similar fashion. Exemplary protocols that can be used with hub assemblies include Universal Serial Bus ("USB"), IEEE 1394 ("Fire Wire"), PS2, and RS232.

Conventional USB hubs receive power for low power applications via a positive voltage conductor and a ground conductor from a source, such as the computer, through the upstream port. Conventional USB hubs can operate in the so-called "self-powered" mode when equipped with a connector for connecting with a transformer plugged into a typical AC outlet for providing DC power to the hub for high power applications.

The USB standard is a communication interface standard that enables data transmission/reception between a single USB host and a plurality of USB devices. USB standard compliant interfaces have been widely used as a communication interface that mainly defines a PC as the USB host and its peripheral devices as the USB devices to enable connection between the PC and the peripheral devices. The USB standard adopts a star-shaped logical bus topology in which a single USB host is connected with plural USB devices. The USB 2.0 standard defines three bus transport speeds: a low speed ("LS") of 1.5 Mbit/s, a full speed ("FS") of 12 Mbit/s, and a high speed ("HS") of 480 Mbit/s. Most USB 2.0 hubs are backward compatible to the USB 1.1 standard that includes the LS and FS bus transport speeds.

Laptop computers often have only one or two type "A" USB ports available. Commonly, many peripheral devices connect to a user's laptop computer via the limited number of Type A USB connector plugs on the user's computer. In order to increase the number of available USB ports to connect to, a USB hub is commonly used. Since laptop computers are often moved about to different locations, USB hubs that are small in size, lightweight and have minimal extra cables to lug around are desired by users. Small USB hubs that have two to four downstream USB port connectors are commonly referred to as "travel hubs." A number of hubs with one, two, or even three USB ports molded into one rigid molded unit to save space are currently available. Even with such devices, however, the user needs to put the travel hub into a pocket or compartment in her suitcase or laptop carrying case, whether traveling just a few miles or to another continent.

Another problem with existing USB hubs is that the user needs to locate them close to their computer when they are connected together, and that takes physical space on the user's desktop. Further, the hub needs to be placed away from a desktop edge or the device can be knocked to the floor. One existing solution uses magnets on the underside of the hub, so that the hub can be placed on the side or top of the user's PC cabinet. This solution is limited in application to PCs with steel or iron exterior cases, not ones constructed of aluminum or plastic as with most laptop computers. Another way to secure the USB hub away from the desktop that is equally effective with or without the presence of an iron or steel surface, would offer the user a much greater range of possible places to secure her USB hub.

USB hubs can be configured in a variety of shapes and sizes with a varying number of ports, commonly ranging from two to seven ports. Travel hubs, designed for use primarily with laptop computers, have two to four available bus-powered ports. Often, when a laptop user docks her computer at home or work, she needs a USB hub that has more than the two to four bus-powered ports. That is, she is in need of self-powered ports, as described above. Until now, this meant that the laptop user needed to purchase two hubs, i.e., a travel hub and a larger conventional USB hub, to get additional ports with the DC powered port option.

Accordingly, there is a need for a portable DC-powered hub that can be easily and quickly stored during travel, whether for a five minute transport across the street or a two-week trip out of the country, while saving more of the available space for storage of other items. Additionally, there is a need for such a device that can be kept secure and out of the way from the user's desktop, freeing up space on the user's desktop for placement of other items.

SUMMARY OF THE INVENTION

The present invention provides a connector hub apparatus that includes a first body containing multiple downstream connectors that is connected to an upstream connector. The upstream connector is accessible from a second body. A carabiner clip is integrated with or connected to a portion of the first body and provides a quick and convenient way to secure the hub apparatus during transport. The following embodiments of the invention are described in terms of USB port connectors and are illustrative only. The embodiments are not to be considered limiting in any respect, as the invention can work equally well with a variety of types of electrical and electro-optical serial port connectors that employ other protocols such as Fire Wire, RS232 and PS2.

In one embodiment, the hub apparatus is a USB hub that has a non-locking carabiner clip attached to one or more portions of the apparatus. The carabiner clip can comprise a spring-loaded rotating gate element that can rotate to the open position by the application of force by the user's finger, thereby allowing the carabiner clip to be attached to a bag, belt loop, purse strap, bundle of wires, and the like. The clip can be used for multiple functions, such as holding the hub in place during travel or securing the hub in a portion of the user's work area that keeps the hub apparatus off the user's desk. In another embodiment, the carabiner clip can have a locking clip mechanism that prevents the clip from opening during travel by use of a ratcheting mechanism with a release button. In yet another embodiment, the locking clip utilizes a twist-lock gate that is similar to a nut on a bolt and requires the user to twist the nut to release the gate mechanism of the carabiner clip. The USB hub can have an upstream USB connector that is accessible from the surface of one portion of the USB hub, while in another embodiment, the USB hub can have an attached upstream connector and plug. This eliminates the need to carry an upstream cable when traveling with the hub apparatus.

In accordance with one aspect of the embodiments described herein, there is provided a connector hub system that allows many devices to be connected to a single connector on a host computer or another hub. The system comprises a first body with a plurality of downstream connectors that are accessible from a surface of the first body, a second body with an upstream connector coupled to the plurality of downstream connectors, and a carabiner clip that is integral with the first body. One or more of the downstream connectors comprise a slot that can receive a USB connector, while the upstream connector comprises a serial connector head. The first and second bodies can be placed or folded together into one or more compact shapes, while the downstream ports remain accessible. The carabiner clip comprises a gate member that can be selectively opened and that pivots about a clip hinge from a closed position to one or more open positions.

In accordance with another aspect of the embodiments described herein, there is provided a connector hub system that allows many devices to be connected to a single connector on a host computer or another hub. The system comprises a first body with one or more downstream connectors, a second body with one or more upstream connectors coupled to the one or more downstream connectors, and a carabiner clip that is engaged with the first body. The first and second bodies can be placed together into one or more compact shapes. The carabiner clip comprises a gate member that can be selectively opened and moves between a closed position and one or more open positions.

In accordance with another aspect of the embodiments described herein, there is provided a connector hub apparatus that allows many devices to be connected to a single connector on a host computer or another hub. The system comprises a first body with one or more downstream connectors, a second body with one or more upstream connectors coupled to the one or more downstream connectors, and a carabiner clip that is connected to the first body and/or the second body. The first and second bodies are connected via a cable. The carabiner clip comprises a gate member that can be selectively opened and moves between a closed position and one or more open positions.

In accordance with yet another aspect of the embodiments described herein, there is provided a connector hub system that allows many devices to be connected to a single connector on a host computer or another hub. The system comprises a first portion with a plurality of downstream connectors that are accessible from a surface of the apparatus, a second portion with an upstream connector coupled to the plurality of downstream connectors, and a carabiner clip that is engaged with the first portion and/or the second portion. One or more of the downstream connectors comprise a slot that can receive a first serial bus connector, while the upstream connector comprises a second slot for receiving a second serial bus connector. The carabiner clip comprises a gate member that can be selectively opened and that moves between a closed position and one or more open positions.

A more complete understanding of the connector hub apparatus that has a carabiner clip connected to one or more potions of the hub apparatus will be afforded to those skilled in the art, as well as a realization of additional advantages and objects thereof, by consideration of the following detailed description of the preferred embodiment. Reference will be made to the appended sheets of drawings, which are described below.

DETAILED DESCRIPTION OF THE PREFERRED EMBODIMENT

The present invention provides a connector hub apparatus, in which a carabiner clip is attached to a first body of the hub apparatus that comprises a plurality of downstream port connectors and a second body that comprises at least one upstream port connector. The hub apparatus can be clipped to a user's bag, purse, belt loop, and the like, to simplify traveling with the hub apparatus. The clip can also be fastened around a bundle of cables or wires to securely hold the hub apparatus off the user's desktop, thereby saving desk space. The following embodiments of the invention are described in terms of USB port connectors, are illustrative only, and are not to be considered limiting in any respect. In the detailed description that follows, like element numerals are used to indicate like elements appearing in one or more of the figures.

Figure 1:
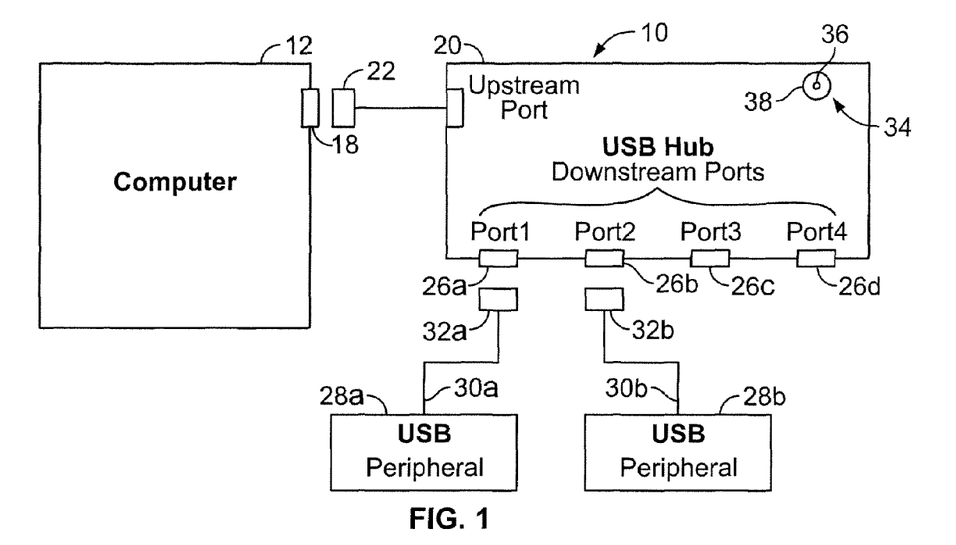
FIG. 1 is a block diagram illustrating a conventional USB hub.

FIG. 1 is a block diagram illustrating the connection of a USB hub 10 to a computer 12. The computer 12 has a USB interface (not shown) for receiving data from the USB hub 10. The computer 12 includes at least one USB port connector 18. The USB hub 10 includes an upstream port connector 20 having a corresponding USB plug 22 that connects to the USB connector 18 of the computer 12.

The USB hub 10 also includes a plurality of downstream USB port connectors 26a-26d that permit multiple USB peripheral devices 28a and 28b, such as a keyboard, mouse, scanner, or printer, to be coupled to the computer 12 through the USB hub 10. The USB peripheral devices 28a and 28b are each connected by connection cables 30a and 30b to USB plugs 32a and 32b, which mate with the downstream port connectors 26a-26d of the USB hub 10.

The USB hub 10 can contain connections for receiving power in two ways. First, the USB hub may be bus-powered for applications in which the total current provided to the hub is less than approximately 500 mA. In bus-powered applications, the USB hub receives power through the upstream port 20 from the USB plug 22 that contains separate positive and ground conductors. The USB hub can transfer a limited amount of current, approximately 100 mA, to each of four devices through the downstream ports 24 via positive and ground conductors in the downstream port connectors 26a-26d.

The USB hub 10 can also include a separate power connector 34 for receiving sufficient power to supply the higher current demands to the downstream ports 26a-26d in high power applications when the hub is operated in the self-powered mode. The available current draw through the downstream ports in such powered applications is approximately 500 mA per port. The power connector 34 includes a positive voltage conductor 36 and a ground conductor 38 for receiving a DC voltage, preferably 5 volts, from a transformer (not shown) connected to an AC powered outlet (also not shown).

Figure 2:
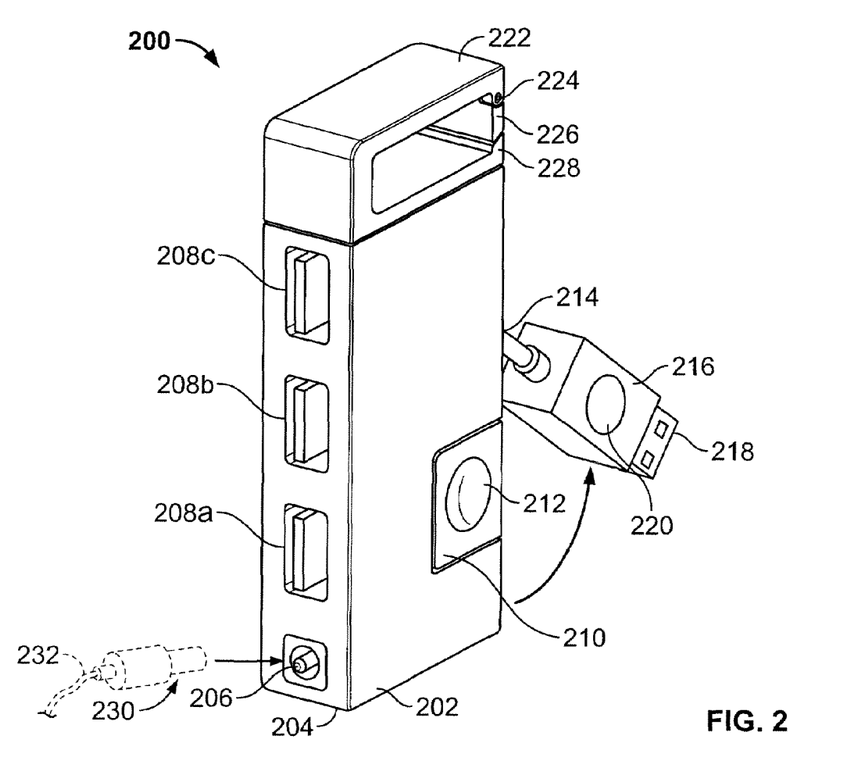
FIG. 2 is a perspective view of an exemplary embodiment of a USB hub apparatus with an attached non-locking carabiner clip in a closed position and an outstretched upstream USB cable with a USB plug.

FIG. 2 is a perspective view of an exemplary embodiment of a USB hub apparatus 200 with an attached non-locking carabiner clip 222 in a closed position and an outstretched upstream USB cable 214 with an attached USB plug 218. The hub apparatus 200 further comprises a first body or USB hub 202, a carabiner clip 222, an upstream cable 214, and an upstream connector or serial connector head or male type "A" USB plug 218. The USB hub 202 comprises three accessible downstream port connectors or slots or female type "A" USB port connectors 208a-208c accessible from a side panel 204, an optional power connector 206, and an upstream connector head retainer clip 210 that has a recessed circular portion or dimple 212. The carabiner clip 222 is connected or engaged to the USB hub 202 and comprises a gate 226 attached to the carabiner clip 222 by a pin or screw 224, a lower lip or catch 228, and an internal spring (not shown) that is mounted within the front portion of the carabiner clip 222. The USB plug 218 comprises a second body or molded connector cover 216, a recessed circular portion or dimple 220, and the upstream cable 214. One of skill in the art will recognize that in other embodiments, the USB hub 202 can comprise a different number of downstream port connectors 208a-208c and the molded connector cover 216 can comprise more than one USB connector plug 218. Further, in another embodiment, a female USB connector can be mounted on one side of the body of the USB hub 202 in place of the attached cable 214 and storable USB plug 218 (see FIG. 5).

The carabiner clip 222 illustrated is a straight non-locking carabiner clip. As such, the gate 226 is spring-loaded by the internal spring attached to the pin 224 so that the gate 226 can remain in close proximity to the catch 228. The catch 228 acts as a stop to prevent the gate 226 from accidentally opening while the user travels with the hub apparatus 200. In other embodiments, the catch 228 can form a tongue-in-groove arrangement (not shown) with the end of the gate 226 that provides a more secure carabiner clip 222. Returning to the embodiment of FIG. 2, the gate 226 can be selectively opened by rotating the gate 226 about the attached pin 224. The pin 224 is part of a clip hinge (not shown) at the front edge of the carabiner clip 222. The gate 226 is spring-loaded so that the application of force or pressure on the gate 226 is required to open the gate for attachment of the carabiner clip 222 to a suitable object by the user. As illustrated in FIG. 2, the gate 226 rotates inwardly so that the gate 226 is adapted to rotate from the closed position illustrated to an approximate horizontal position that is parallel to the top portion of the carabiner clip 222. The gate 226 returns to the original closed position illustrated in FIG. 2 when the force is removed. The particular amount of force required to rotate or swivel the gate is dependent on the tension created by the spring as well as other factors. The carabiner clip 222 and the gate 226 can be constructed of metal, plastic, rubber, and the like.

One skilled in the art will recognize that the carabiner clip 222 can be bent or curved (not shown). The straight type of carabiner clip is generally stronger and easier to manufacture than the bent type. Additionally, because the shape of the USB hub 202 is rectangular, having at least one straight side of the carabiner clip 222 creates more surface area to join with at least one side of the USB hub 202, adding strength and ease of manufacture. The carabiner clip 222 can be permanently attached to one or more sides of the USB hub 202 so that the clip 222 is integral with the USB hub 202. This can be accomplished by molding the housing or case of the USB hub 202 and the carabiner clip 222 into a single unit, or the USB hub 202 can be connected to the clip 222 by other secure means such as screws or clips (not shown). This is especially so if both the carabiner clip 222 and the body of the USB hub 202 are constructed of the same material, such as plastic. In other embodiments, the carabiner clip 222 can be removably attached to the USB hub 202 by removing the screws or clips that secure the carabiner clip 222 to one or more sides of the USB hub 202.

The USB connector plug 218 and attached cable 214 are operatively coupled to the downstream USB port connectors 208a-208c of the USB hub 202. The USB connector plug 218 and attached cable 214 can be retracted from one side of the USB hub 202 by removing the retainer clip 210 from the body of the USB hub 202. The retainer clip 210 can be removed from the hub 202 to allow the cable 214 and the USB connector plug 218 to be released from the stored position. The operation and construction of the retainer clip 210 is shown in detail in FIGS. 3A and 3B and discussed further below. The cable 214 can be of various lengths and can be extended or retracted by gently tugging on the cable, which can be retained inside the hub 202 on a spring-loaded reel and a ratcheting type mechanism (not shown) inside the hub 202. One of skill in the art will recognize that other methods of storing and releasing varying lengths of the cable 214 from the body of the hub 202 are within the scope and spirit of the invention. In another embodiment, the cable 214 extends outward from the body of the hub 202 by a predefined length. The length of the cable 214 cannot be altered by the user.

In FIG. 2, an optional power connector 230 is shown detached from the power connector 206. In this bus-powered mode of operation, the hub apparatus 200 can support low power USB devices such as a computer mouse or a keyboard that can be connected to USB port connectors 208a-208c. The power plug 230 comprises a power cable 232 that can be attached to a variety of suitable power sources such as an AC wall transformer, a battery pack, or an automobile cigarette lighter adapter. When the power connector 230 is removably attached to the power connector 206 and the power cable 232 is attached to a compatible power source, the USB hub 202 can be used in the self-powered mode. In this mode, the hub apparatus 200 can support high power USB devices that can be connected to the USB port connectors 208a-208c.

In another embodiment (not shown), one or more of the downstream USB port connectors 208a-208c can comprise a slot for receiving a memory card or the like. The USB hub 202 in turn contains an internal memory device reader that communicates with a computer (not shown) or other compatible device via a removable connection with the USB plug 218.

Figures 3A, 3B:
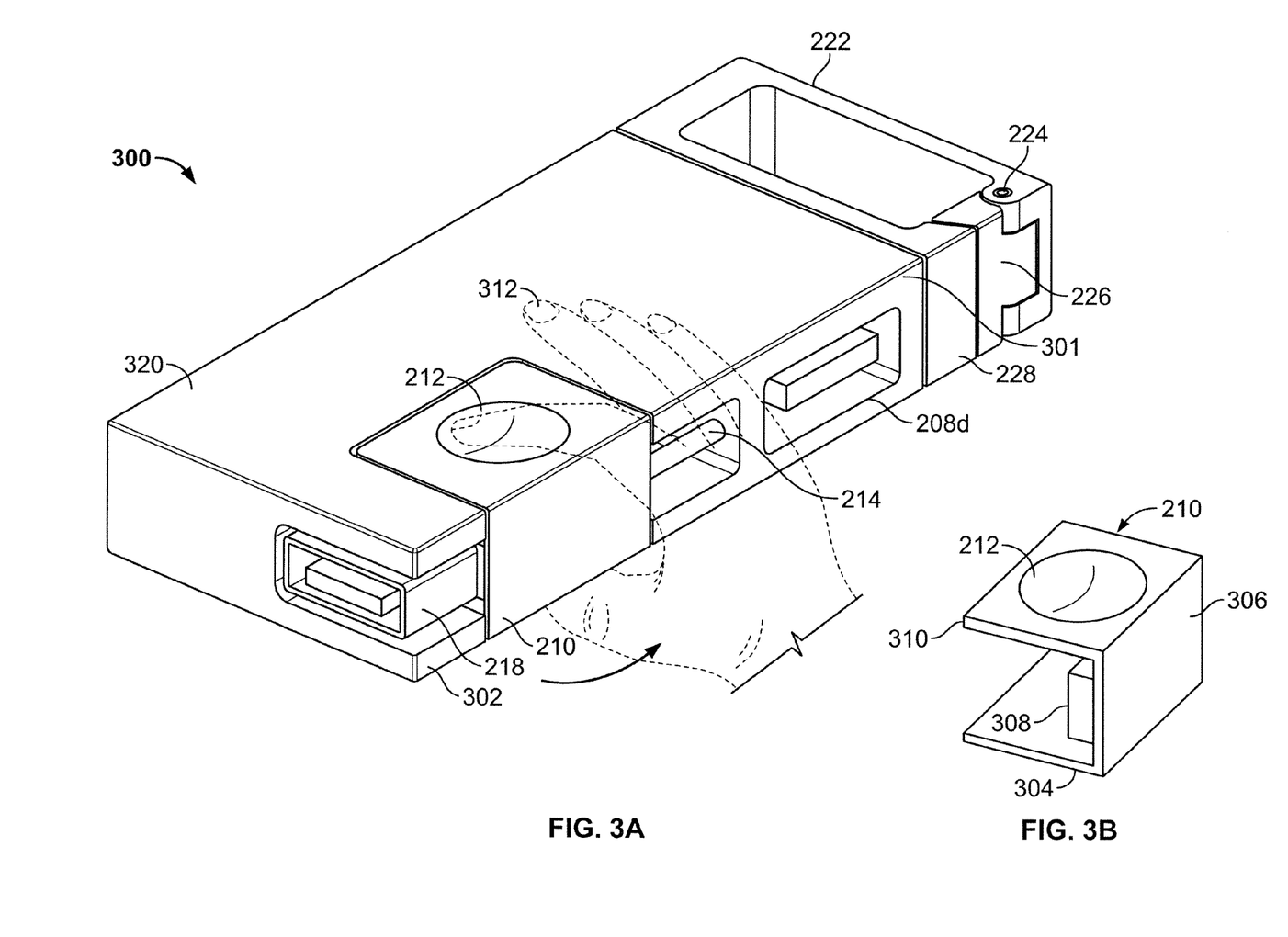
FIG. 3A is a perspective view of another embodiment of a USB hub apparatus with the upstream USB cable with the USB plug shown in a stored position.
FIG. 3B is a perspective view of a removable clip for releasing the upstream USB cable with the USB pug from a stored position.

FIG. 3A is a perspective view of another embodiment of a USB hub apparatus 300 with the upstream USB cable 214 with the USB plug 218 shown in a stored or folded position forming a single compactly shaped apparatus 300. In this embodiment, the USB hub apparatus 300 shown is essentially the same as the embodiment of FIG. 2. The differences illustrated are: 1) an additional accessible downstream connector or slot or female type "A" USB port connector 208d is mounted on the right portion of a USB hub 320 between edges 301 and 302; 2) the cable 214 with the USB connector plug 218 is shown in the stored position; 3) the upper edge 301 has been added; and 4) the lower edge 302 has been added. Downstream USB port connectors 208a-208c are located on the opposing side of the USB hub 320 and are not visible in FIG. 3A (see FIG. 2). A variety of USB compatible devices can be operatively connected to the downstream port connectors of the USB hub 320, such as USB keyboards, mice, scanners, printers, flash memory devices, music players, and the like. One of skill in the art will recognize that the USB plug 218 can be operatively connected to compatible USB port connectors attached to a variety of devices, including a USB connector located at the downstream end of another USB hub (e.g., "daisy chaining" or "stacking" USB hubs in series).

When traveling with the USB hub 320, it may be desirable to store the cable 214 and the USB plug 218 within the USB hub 320 to save space and avoid the USB plug 218 being caught with nearby items in the user's luggage, purse, etc. This is accomplished by using the removable retainer clip 210. The retainer clip 210 secures the molded connector cover 216 and the cable 214 connected to the USB plug 218 within the upper edge 301 and the lower edge 302. The retainer clip 210 can be removed from the USB hub 320 by the user placing one of her fingers 312 in the dimple 212 and her thumb around the retainer clip 212 and gently pulling away from the USB hub 202.

FIG. 3B is a perspective view of the removable clip 210 for releasing the upstream USB cable 214 and the USB plug 218 from a stored position. The removable retainer clip 210 comprises a top edge 310, a bottom edge 304, a front side 306, a dimple 212, and a support 308. The retainer clip 210 snaps on the USB hub 202 and mounts flush with the top edge 301 and the bottom edge 302. When the retainer clip 210 is mounted on the USB hub 202 (see FIG. 2), the support block 308 secures the retainer clip 210 against the molded connector cover 216 (see FIG. 2). The dimple 212 can be a concave circle that extends downward from the top edge 310, contacting the dimple 220 (see FIG. 2) on the molded connector 216. This creates a pressure fit that, together with the contact of the support block 308 with the molded connector cover 216, can retain the cable 214, the molded cover 216, and the USB plug 218 within the USB hub 202 in a stored position. One of skill in the art will recognize that the retainer clip 210 can be removably mounted to the USB hub 202 or USB hub 320 (see FIG. 3) by other fastening methods such as tabs extending from the top edge 310 and bottom edge 304 that mate with matching slots on the corresponding portions of the top edge 301 and the bottom edge 302.

Figure 4:
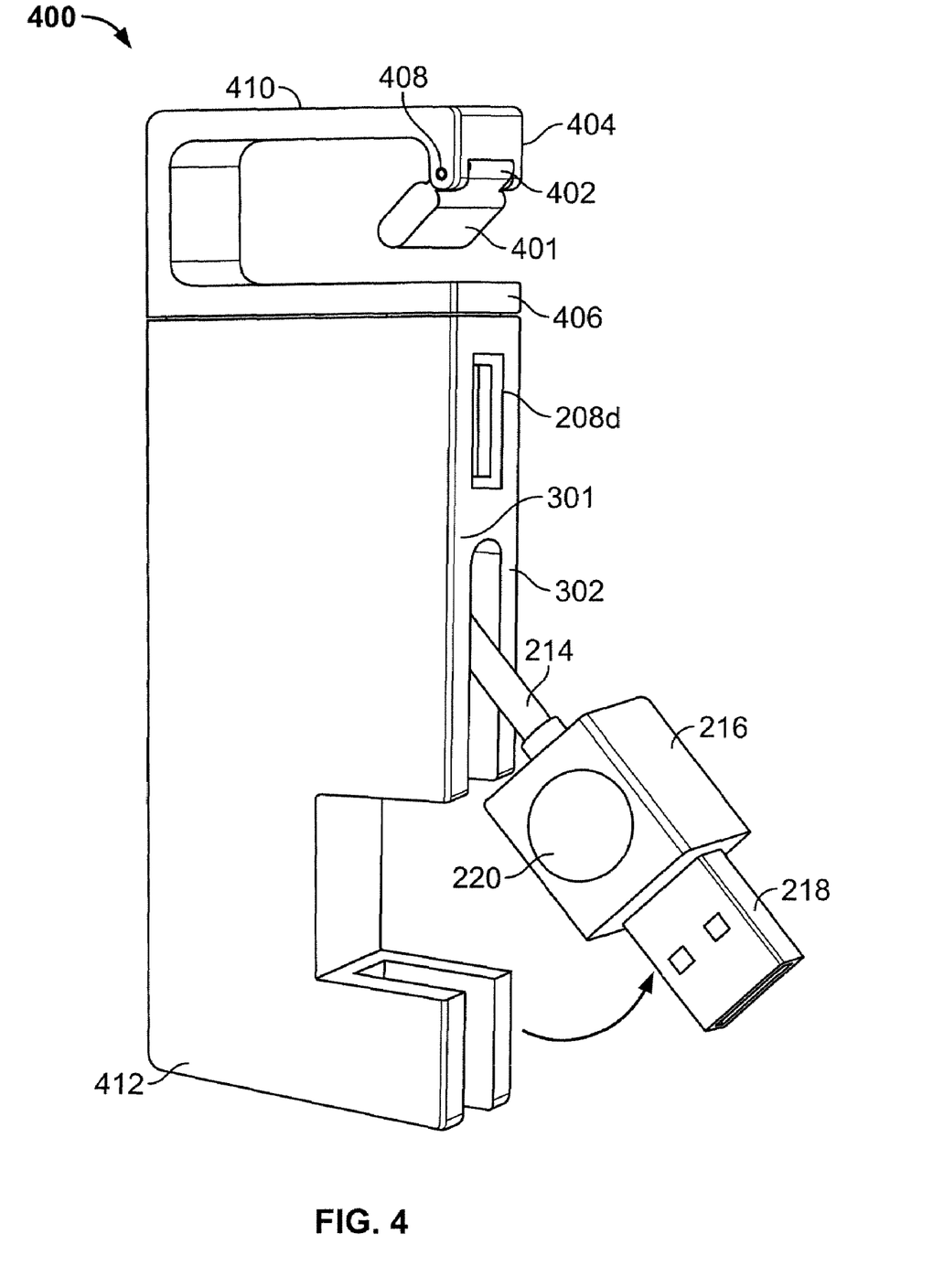
FIG. 4 is a perspective view of another embodiment of a USB hub apparatus with a carabiner clip in an open position and the removable clip removed from a USB hub.

FIG. 4 is a perspective view of another embodiment of a USB hub apparatus 400 with a carabiner clip 410 in an open position and the removable clip 210 shown removed from a USB hub 412. In this embodiment, the USB hub apparatus 400 shown is essentially the same as the embodiment of FIG. 3A, but the non-locking carabiner clip 222 of FIG. 3A has been replaced with the locking carabiner clip 410. The differences illustrated are: 1) the lower lip or catch 228 has been eliminated and replaced with a flat rectangular clip support 406; 2) the gate 226 has been replaced with a more elliptically shaped gate 401; 3) the gate 401 connects to a front edge 404 of the carabiner clip 410 by a ratcheting connector 402; 4) the pin 224 has been replaced with pin 408; 5) the internal spring attached to the pin 224 has been eliminated entirely so that no spring attaches to pin 408; and 6) a ratchet release button (not shown) located along the top portion of the carabiner clip 410 has been added. Similar to the discussion of the methods of attaching the catch 228 to the hub 202 in FIG. 2 above, here the clip support 406 can be permanently attached to one or more sides of the USB hub 412 by being molded together in one piece or attached by other secure means such as screws or clips (not shown).

To place the carabiner clip 410 around an object such as a purse strap, the user simply pushes the release button and then pushes the ratcheting gate 401 inward to a sufficient predefined position to allow the object to be inserted into the carabiner clip 410. The user than pushes or ratchets the gate 401 back to the neutral or closed position.

The carabiner clip 410 illustrated requires less force from the user to rotate the gate 401 sufficiently to allow the carabiner clip 410 to be clipped around an object than the carabiner clip 222 illustrated in the embodiment of FIGS. 2 and 3A does. The carabiner clip 410 is also more secure, as the user must press the ratcheting release button before she can rotate the gate 401. Thus, there is little chance of the carabiner clip opening and becoming detached from a belt loop, bag, and the like during travel. In other embodiments, the ratchet release button can be located on different portions of the carabiner clip 410 than the top portion discussed above.

Figure 5:
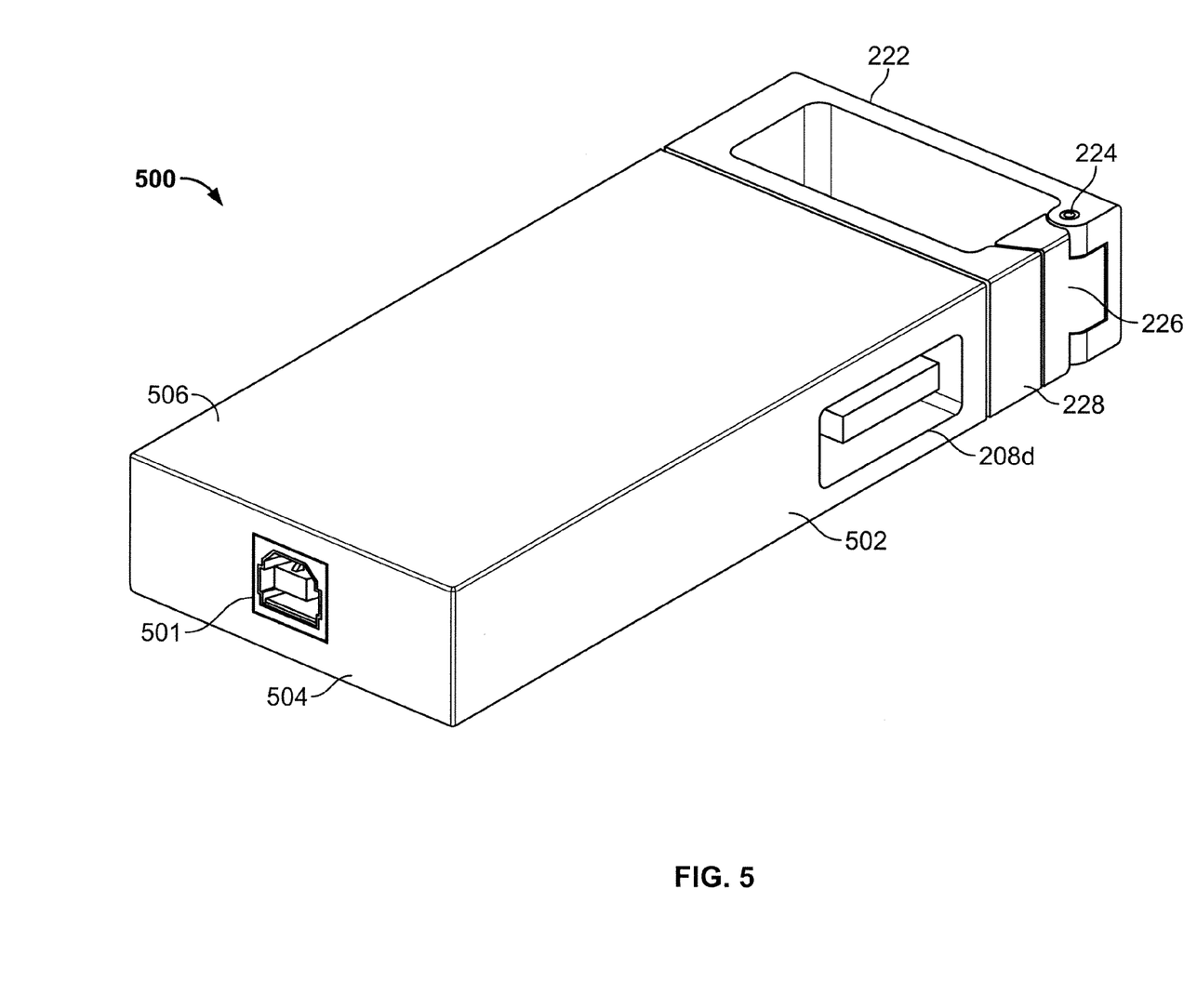
FIG. 5 is a perspective view of another embodiment of a USB hub apparatus with an upstream USB connector that is accessible from the surface of one portion of a USB hub.

FIG. 5 is a perspective view of another embodiment of a USB hub apparatus 500 with a slot or an upstream USB connector 501 that is accessible from the surface of one portion of a USB hub 506. In this embodiment, the USB hub apparatus 500 shown is similar to the embodiment of FIG. 3A, but the upstream cable 214, the type A USB plug 218, the retainer clip 210, the dimple 212, the upper edge 301, and the lower edge 302 have been eliminated. Instead, a type B USB port connector 501 and side panels 502 and 504 have been added to the USB hub 506. The upstream USB port connector 501 is accessible from the side panel 504 of the USB hub 202 and is operatively coupled to the downstream USB port connector 208d that is accessible from the side panel 502 of the USB hub 202. The downstream USB port connectors 208a-208c are also present on the opposing side panel (not shown), but are not visible in FIG. 5 (see FIG. 2).

In order to connect the USB hub 500 to a USB port of a computer 12 (see FIG. 1) or the downstream USB port connector of another USB hub (not shown), an external USB cable (not shown) can be connected to the upstream USB port connector 501. With this embodiment, the user needs to carry an additional USB cable to attach the hub apparatus 500 to her computer 12 or other compatible device when traveling with the hub apparatus 500, as opposed to the embodiments of FIGS. 2-4. On the other hand, one advantage of this embodiment is that the apparatus 500 can be placed at a greater distance from the users computer or other compatible device then the embodiments of FIGS. 2-4, by simply utilizing a longer USB cable than the attached cable 214 (see FIGS. 2-4).

Figure 6:
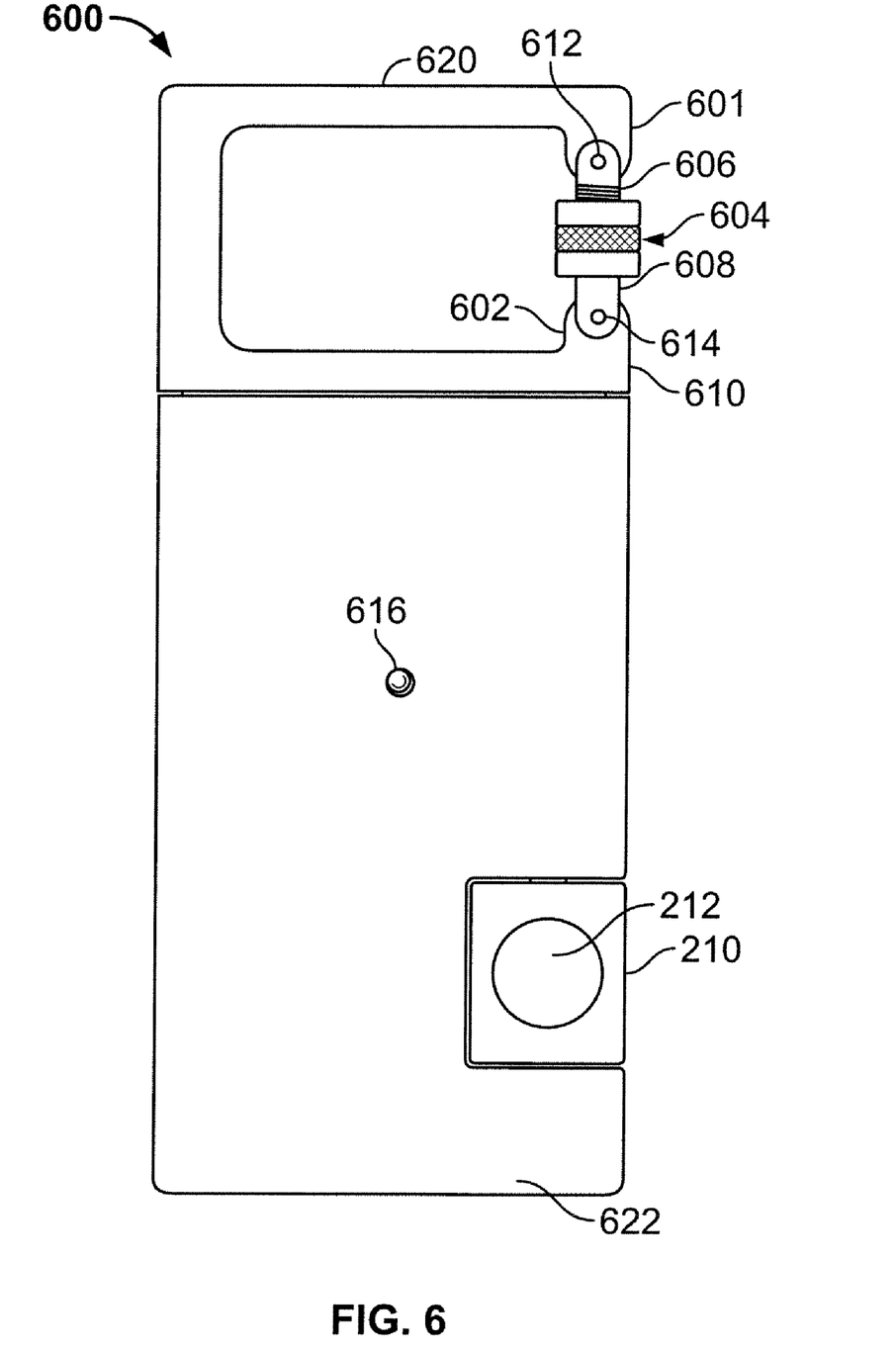
FIG. 6 is a front elevational view of yet another embodiment of a USB hub apparatus with a locking carabiner clip attached to a USB hub and the upstream USB cable with the USB plug shown in a stored position.

FIG. 6 is a front elevational view of yet another embodiment of a USB hub apparatus 600 with an attached locking carabiner clip 620 and the upstream USB cable 214 with the USB plug 218 shown in a stored position. In this embodiment, the USB hub apparatus 600 shown is essentially the same as the embodiment of FIG. 4, but the locking carabiner clip 222 that utilizes a ratcheting mechanism has been replaced with the locking carabiner clip 620 that utilizes a twist-lock gate. Although not visible in FIG. 6, the USB hub 622 has the four downstream port connectors 208a-208d and the upstream connector plug 218 illustrated in FIGS. 2, 3A and 4. Other differences illustrated in FIG. 6 are: 1) the front edge 404 has been replaced with upper front edge 601; 2) pin 408 has been replaced with pin 612; 3) pin 614 has been added; 4) the lower front edge 602 has been added; 5) the clip support 406 has been replaced with a clip support 610; 6) the gate 401 has been replaced by an upper gate 606 and a lower gate 608; 7)

a locking nut 604 with a knurled surface that joins the upper gate 606 to the lower gate 608 has been added; and 8) an optional indicator 616 is mounted on the front portion of the USB hub 622.

To place the carabiner clip 620 around an object such as a purse strap, the user grasps the knurled surface of the nut 604 and twists the locking nut 604 to unlock the upper gate 606 from the lower gate 608. Next, the locking nut 604 is slid downward onto the lower gate 608. The upper gate 606 is threaded and can rotate about the pin 612 to allow the carabiner clip 620 to grasp objects, while the lower gate 608 does not rotate and is retained in the lower front edge 602 by the pin 614. The upper gate is then locked into position by sliding the locking nut 604 upward to contact the threaded portion of the upper gate 606 and twisting the locking nut 604 in the direction opposite to that used to unlock the upper gate 606. The pin 612 is mounted in the upper front edge 601 and the pin 614 is mounted in the lower front edge 602. The clip support 610 is attached to one portion of the USB hub 622. As was discussed with respect to the corresponding elements in FIGS. 2 and 4 above, the clip support 610 can be permanently attached to one or more sides of the USB hub 622 by being molded together in one piece or attached by other secure means such as screws or clips (not shown).

The carabiner clip 622 illustrated in FIG. 6 is more secure than the carabiner clip 222 illustrated in FIGS. 2-3A, in that the lower gate 608 is very unlikely to open unintentionally if the gate 226 (see FIG. 2) accidentally gets pressed against an object, causing the hub apparatus 200 (see FIG. 2) to possibly fall to the ground and break. Twist-lock carabiner clips are often used to anchor ropes in rock climbing. The twist-lock gate carabiner clip 620 requires more effort by the user to open than the non-locking type, but one hand can be used to untwist the locking nut 604 and then open the lower gate 608. One of skill in the art will note that other types of locking carabiner clips such as those having auto-locking gates are also within the spirit and scope of the current invention.

The optional indicator 616 can comprise a mono-colored Light Emitting Diode ("LED") that illuminates when the USB hub 622 is connected to an upstream signal through USB connector plug 218 (see FIGS. 2, 3A, and 4). In other embodiments, the indicator is a multicolored LED that glows one color when there is an upstream port connection through USB plug 218 and glows a second color when there is at least one USB peripheral or other downstream USB device operatively connected to one or more of the USB port connectors 208a-208d. One skilled in the art will recognize that other variations of the indicator are possible in other embodiments, such as the USB hub 622 having a plurality of multicolored LEDs (or other types of light sources) that change colors when the individual USB port connectors 208a-208d are connected to the hub or when DC power is supplied to the hub through power connector 206 (see FIG. 2).

Having thus described a preferred embodiment of a connector hub apparatus with a carabiner clip attached to one or more portions thereof, it should be apparent to those skilled in the art that certain advantages of the invention have been achieved. For example, the hub can be quickly and securely transported by clipping the hub apparatus to a user's purse, backpack, belt loop, and the like, but it should also be appreciated that various modifications, adaptations, and alternative embodiments thereof may be made within the scope and spirit of the present invention. For example, USB (as defined, for example, in the USB 2.0 specification), FireWire (as defined in the IEEE 1394 standard), Bluetooth (as defined in the Bluetooth specification and published by the Bluetooth Special Interest Group), RS232, PS2, and fiber optic connectors are all within the scope of the invention.

What is claimed is:

1. A connector hub system, comprising:
   a first body with a plurality of downstream connectors accessible from a surface of the first body, at least one of the plurality of downstream connectors comprising a female connector for receiving a universal serial bus male connector;
   a second body with an upstream connector operatively coupled to the plurality of downstream connectors, the upstream connector comprising a male connector;
   a removable retainer clip configured to mate with at least one of the first body and the second body; and
   a carabiner clip integral with the first body, the clip comprising a selectively openable gate member adapted to pivot about a clip hinge from a closed position to at least one open position;
   wherein the first and second bodies are configured to be folded into at least one compact shape by retracting the second body into the first body while retaining external accessibility to the upstream connector, the retainer clip being configured to secure the second body to the first body in the at least one compact shape.

2. The system as recited in claim 1, wherein the first and second bodies are connected via a cable.

3. A connector hub system, comprising:
   a first body with at least one downstream connector;
   a second body with at least one upstream connector operatively coupled to the at least one downstream connector, the second body comprising a first dimple;
   a retainer clip comprising a second dimple configured to mate with the first dimple of the second body; and
   a carabiner clip engaged with the first body, the clip comprising a selectively openable gate member adapted to move between a closed position and at least one open position;
   wherein the first and second bodies are configured to be placed into at least one compact shape by retracting the second body into the first body while retaining external accessibility to the upstream connector, the retainer clip being configured to secure the second body to the first body in the at least one compact shape.

4. The system as recited in claim 3, wherein the at least one downstream connector comprises a universal serial bus connector.

5. The system as recited in claim 4, wherein the universal serial bus connector comprises a female connector for receiving a corresponding male connector.

6. The system as recited in claim 3, wherein the at least one upstream connector comprises a universal serial bus connector.

7. The system as recited in claim 6, wherein the universal serial bus connector comprises a male connector.

8. The system as recited in claim 3, wherein the first and second bodies are connected via a cable.

9. A connector hub apparatus, comprising:
   a first body with at least one downstream connector;
   a second body with at least one upstream connector operatively coupled to the at least one downstream connector, the second body comprising a first dimple;
   a retainer clip comprising a second dimple configured to mate with the first dimple of the second body; and
   a carabiner clip connected to at least one of the first and second bodies, the clip comprising a selectively openable gate member adapted to move between a closed position and at least one open position;

wherein the first and second bodies are connected via a cable and are configured to be folded into a compact shape by retracting the second body into the first body, at least one of the at least one upstream connector being externally accessible when the second body is retracted into the first body;

wherein the retainer clip is configured via at least the first and second dimples to secure the second body to the first body in the compact shape.

10. The apparatus as recited in claim 9, wherein the at least one downstream connector comprises a universal serial bus connector.

11. The apparatus as recited in claim 9, wherein the universal serial bus connector comprises a female connector for receiving a corresponding male connector.

12. The apparatus as recited in claim 9, wherein the at least one upstream connector comprises a universal serial bus connector.

13. The apparatus as recited in claim 12, wherein the universal serial bus connector comprises a female connector.

14. A connector hub apparatus, comprising:
 a first portion with a plurality of downstream connectors accessible from a surface of the apparatus, at least one of the plurality of downstream connectors comprising a first female connector for receiving a first serial bus connector;
 a second portion with an upstream connector operatively coupled to the plurality of downstream connectors, the upstream connector comprising a second female connector for receiving a second serial bus connector;
 a removable retainer clip configured to mate with at least one of the first body and the second body; and
 a carabiner clip engaged with at least one of the first and second portions, the clip comprising a selectively openable gate member adapted to move between a closed position and at least one open position;
 wherein the first and second bodies are configured to be folded into a compact shape by retracting the second body into the first body while retaining external accessibility to the upstream connector, the retainer clip being configured to secure the second body to the first body in the compact shape.

15. The apparatus as recited in claim 14, wherein the first slot is adapted to receive a type A universal serial bus connector plug.

16. The apparatus as recited in claim 15, wherein the second slot is adapted to receive a type B universal serial bus connector plug.

* * * * *